(12) United States Patent
Yoshiguchi

(10) Patent No.: US 7,254,871 B2
(45) Date of Patent: Aug. 14, 2007

(54) CORD LOCK HOLDER WITH CORD LOCK, AND STRUCTURE THEREOF

(75) Inventor: Manabu Yoshiguchi, Kamakura (JP)

(73) Assignee: Nifco Inc., Yokohama (JP)

( * ) Notice: Subject to any disclaimer, the term of this patent is extended or adjusted under 35 U.S.C. 154(b) by 145 days.

(21) Appl. No.: 11/090,165

(22) Filed: Mar. 28, 2005

(65) Prior Publication Data
US 2006/0213037 A1 Sep. 28, 2006

(51) Int. Cl.
A44B 21/00 (2006.01)

(52) U.S. Cl. .......................... 24/115 G; 2/160; 24/712.5

(58) Field of Classification Search .............. 24/115 G, 24/136 R, 115 H, 712.5; 248/314; D8/383; 383/72–76; 2/160, 101, 69, 240, 244, 265, 2/266, 117, 137, 144, 145, 300, 336, 341, 2/271, 1, 123, 124, 16, 17, 139, 158, 159, 2/161.1, 162
See application file for complete search history.

(56) References Cited

U.S. PATENT DOCUMENTS

| 5,394,579 A | * | 3/1995 | Walters | ...................... | 5/504.1 |
| 5,711,032 A | * | 1/1998 | Carpenter | ....................... | 2/158 |
| 6,658,704 B2 | * | 12/2003 | Buscart | ..................... | 24/115 G |
| 7,032,276 B1 | * | 4/2006 | Olson | ........................... | 24/171 |

FOREIGN PATENT DOCUMENTS

| JP | 07039518 U | * | 7/1995 |
| JP | 08080204 A | * | 3/1996 |
| JP | 08089316 A | * | 4/1996 |
| JP | 2005-58583 | | 3/2005 |

* cited by examiner

Primary Examiner—James R. Brittain
(74) Attorney, Agent, or Firm—Manabu Kanesaka

(57) ABSTRACT

A cord lock includes a female member with a cylindrical shape, a male member movable along an axial direction of the female member and receiving a part of the female member, and an urging device for urging the male member in a direction to project from the female member. The female member and the male member have holes for passing a cord therethrough, respectively. An attaching portion made of an attachable material is disposed on the female member. The attaching portion may be provided with a thin portion, so that the cord lock is attached to an attaching object through the thin portion. Accordingly, it is easy to attach the cord lock to the attaching object.

4 Claims, 6 Drawing Sheets

CORD LOCK HOLDER WITH CORD LOCK, AND STRUCTURE THEREOF

BACKGROUND OF THE INVENTION AND RELATED ART STATEMENT

The present invention relates to a cord lock holder for attaching a cord lock with a cord passing therethrough to an attaching object, and an article having the cord lock with a cord passing therethrough and a portion tightened by the cord in which the cord lock is operated properly.

A tightening cord W is used for tightening an opening of a bag and the like, and is often provided with a cord lock 200 at a drawing end thereof as shown in FIG. 10. The cord lock 200 is fixed to the cord W in a state that the cord W passes through the cord lock 200. The cord lock 200 can be released from the cord W, so that the cord lock 200 is moved along the cord W to a desired position of the cord W.

FIG. 10 shows an example such that the cord lock 200 is disposed at the drawing end of the tightening cord W passing through an opening 102 of a hood 101 of a parka 100'. Conventionally, the cord lock 200 with the cord W passing therethrough is attached to the cord W, and is not attached to an article with the cord W, i.e., the parka 100' in FIG. 10.

However, in the example shown in FIG. 10, the value of the article is increased by attaching the cord lock 200 in a condition that the article is provided with the cord W and the cord W passes through the cord lock.

Namely, in the example shown in FIG. 10, the cord lock 200 is attached to the cord W drawn out between an upper grommet 103 and a lower grommet 104 at a collar of the parka 100'. When the opening 102 of the hood 101 of the parka 100' is tightened, it is necessary to pull a portion of the cord W between the upper grommet 103 and the lower grommet 104, and the cord lock 200 is re-attached to the cord W. However, it is possible to mistakenly pull another portion of the cord W between the upper grommet 103 and the cord lock 200. In this case, if the cord lock 200 is attached to the parka 100' and covers the upper grommet 103, it is easy to pull a proper portion of the cord W.

In view of the problems described above, an object of the present invention is to provide a cord lock capable of being attached to a desirable position easily and properly.

Another object of the present invention is to provide a cord lock holder for attaching a cord lock to a desirable position easily and properly. Accordingly, it is possible to use the cord lock properly.

Further objects and advantages of the invention will be apparent from the following description of the invention.

SUMMARY OF THE INVENTION

According to a first aspect of the present invention, a cord lock includes a female member with a cylindrical shape; a male member movable along an axial direction of the female member and receiving a part of the female member; and an urging device for urging the male member in a direction out of the female member. The female member and the male member have holes for passing a cord therethrough, respectively. An attaching portion made of an attachable material is disposed on the female member. The attaching portion may be provided with a thin portion, so that the cord lock is attached to an attaching object through the thin portion. Accordingly, it is easy to attach the cord lock to the attaching object. The attaching portion may be provided with a thin portion, so that the cord lock is easily attached to the attaching object through the thin portion.

According to a second aspect of the present invention, a cord lock holder includes a storage portion for retaining a cord lock and an attaching portion made of an attachable material. The cord lock includes a female member, a male member movable along an axial direction of the female member and receiving a part of the female member, and an urging device for urging the male member in a direction out of the female member. The female member and the male member have holes for passing a cord therethrough, respectively. An attaching portion made of an attachable material is disposed on the cord lock holder. The attaching portion may be provided with a thin portion, so that the cord lock holder is attached to an attaching object through the thin portion.

In the second aspect, the cord lock is easily attached to the attaching object through the attaching portion. The cord lock is retained in the cord lock holder, and can be always situated at a specific position of the attaching object. With the cord lock holder, it is possible to retain a conventional cord lock in the cord lock holder, and to attach the conventional cord lock to the attaching object at a specific position. Further, the attaching portion may be provided with the thin portion, so that the cord lock holder is easily attached to the attaching object through the thin portion.

According to a third aspect of the present invention, an article has a portion to be tightened by a cord such as a tightening cord and a pulling cord. The article includes a pair of passing portions penetrating through a material of the article. After the cord passes to one side of the article through one of the passing portions, the cord is pulled out to the other side of the article through the other of the passing portions. Then, the cord is attached to the article at the other side thereof. A cord lock or a cord lock retained in a storage portion of the cord lock holder is attached to the cord between the passing portions. Further, the cord lock or the cord lock holder is attached to the article, so that the cord lock or the cord lock holder covers one of the passing portions.

In the third aspect, the cord lock or the cord lock holder attached to the one side of the article covers the one of the passing portions. When the cord lock is released from the cord, it is possible to adjust a length of the cord only between the cord lock and the other of the passing portions. Accordingly, it is possible to properly use the cord lock.

According to the present invention, it is possible to properly and easily attach the cord lock to the attaching object at a specific position. It is possible to properly and easily attach the cord lock to the attaching object with the cord lock holder. It is possible to properly use the cord lock for the article having a portion to be tightened by the cord.

DETAILED DESCRIPTION OF PREFERRED EMBODIMENTS

Figure 1:
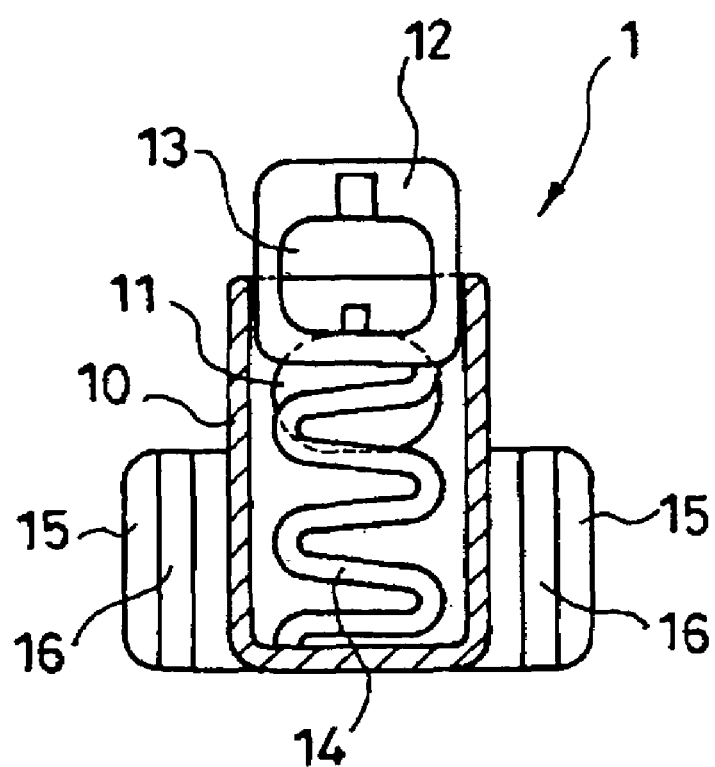
FIG. 1 is a sectional view showing a cord lock according to an embodiment of the present invention.
Figure 2:
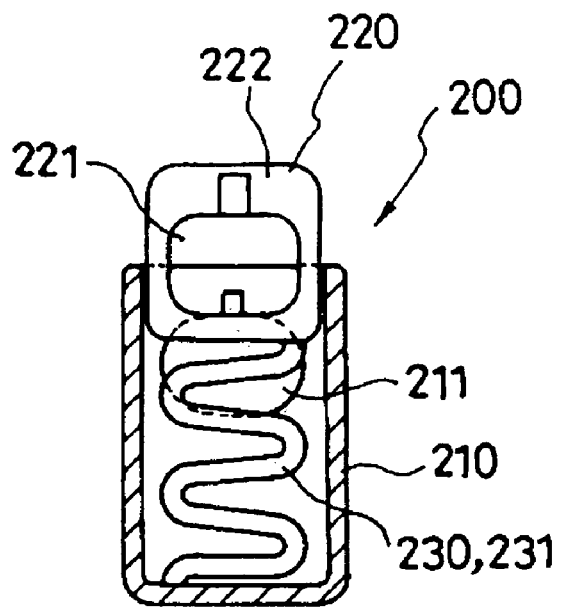
FIG. 2 is a front view showing a cord lock holder and a cord lock to be retained in the cord lock holder.
Figure 2:
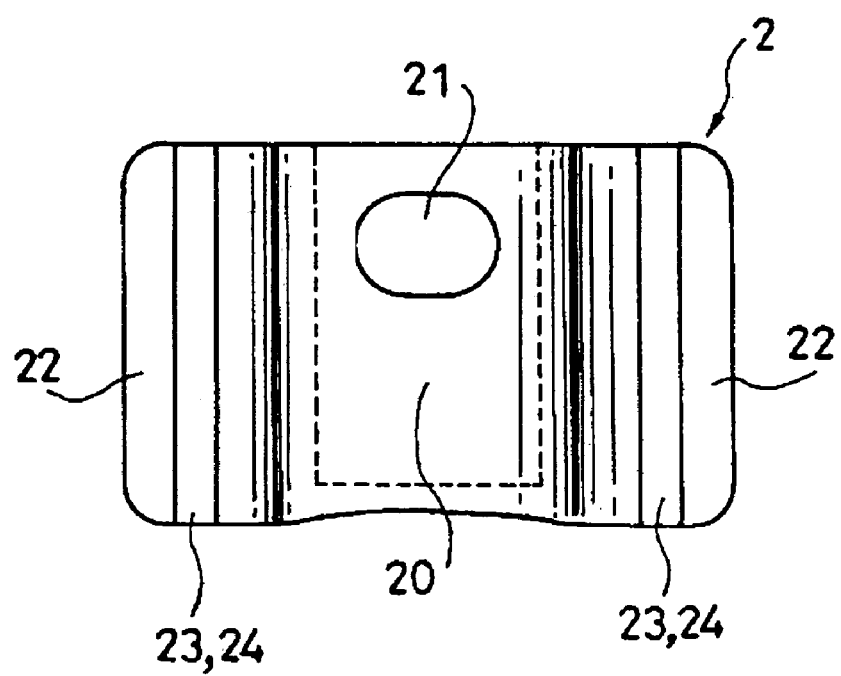
Figure 3:
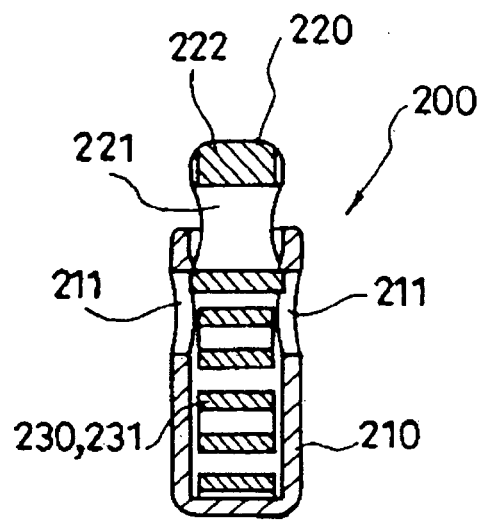
FIG. 3 is a side view of the cord lock holder and the cord lock to be retained in the cord lock holder.
Figure 3:
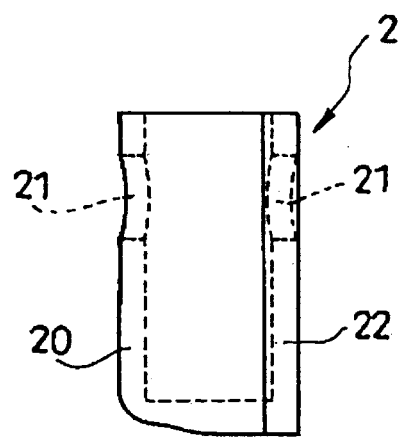
Figure 4:
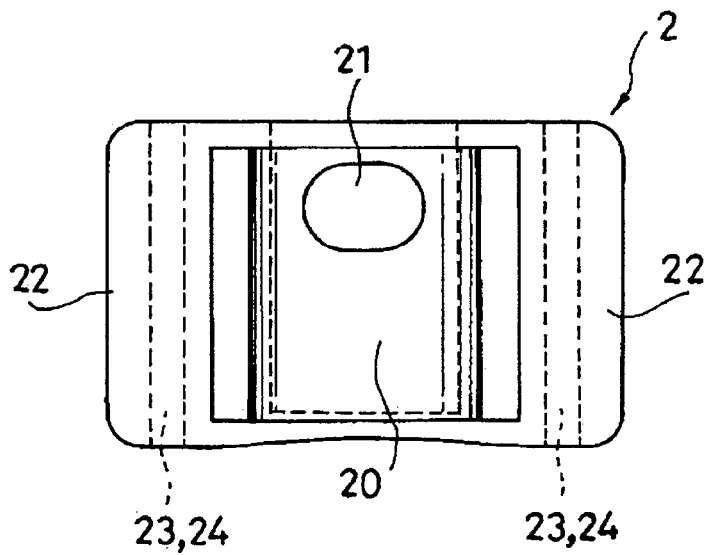
FIG. 4 is a rear view of the cord lock holder.
Figure 5:
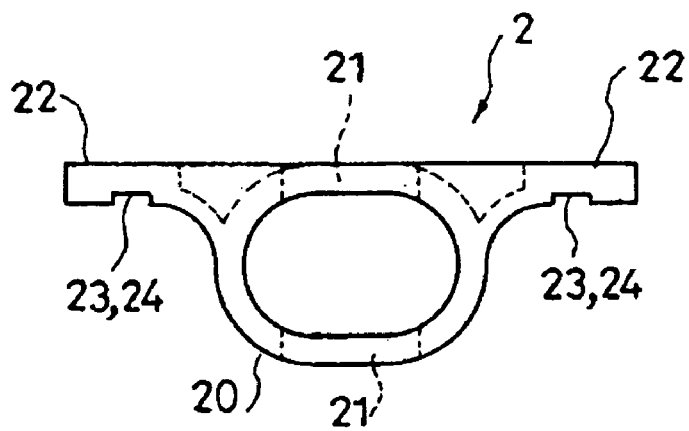
FIG. 5 is a plan view of the cord lock holder.
Figure 6:
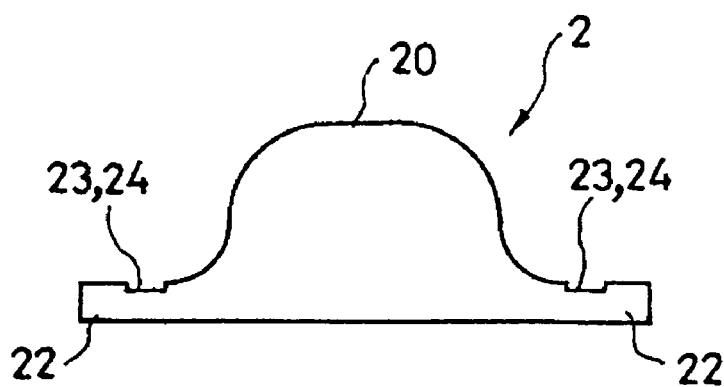
FIG. 6 is a bottom view of the cord lock holder.
Figure 7:
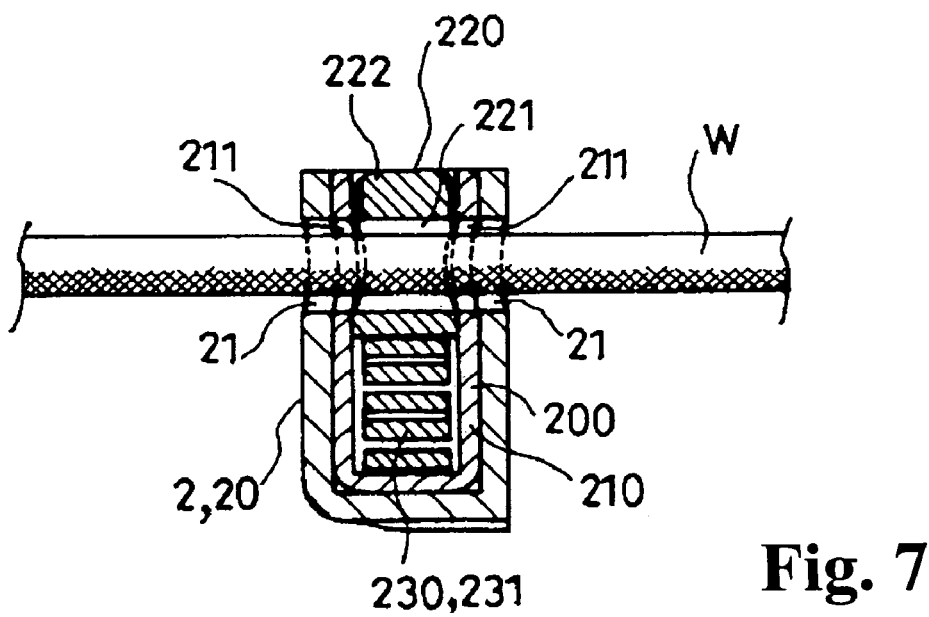
FIG. 7 is a side sectional view of the cord lock holder in use.
Figure 8:
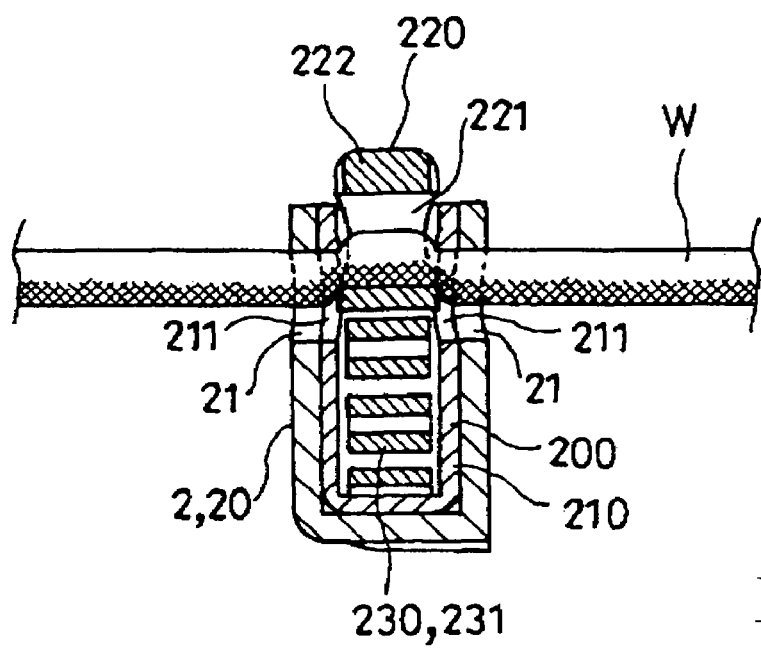
FIG. 8 is a side sectional view of the cord lock holder in use.
Figure 9:
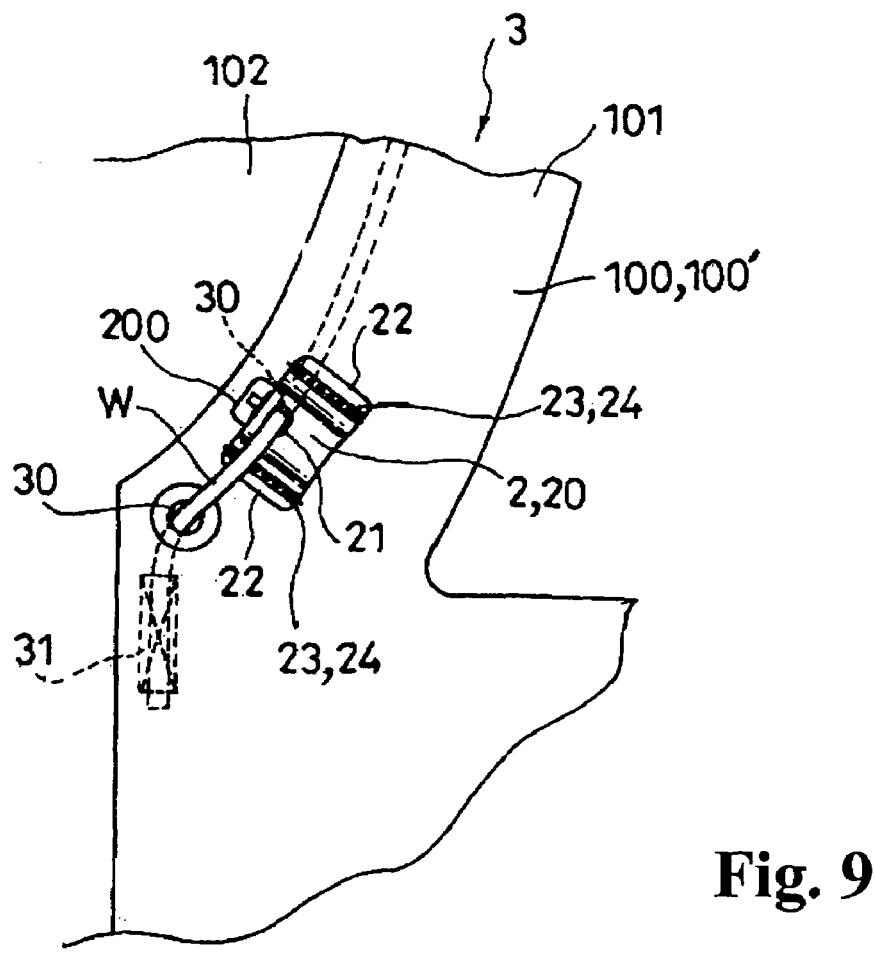
FIG. 9 is a front view showing the cord lock holder with the cord lock retained therein attached to an article having a portion to be tightened by a cord.
Figure 10:
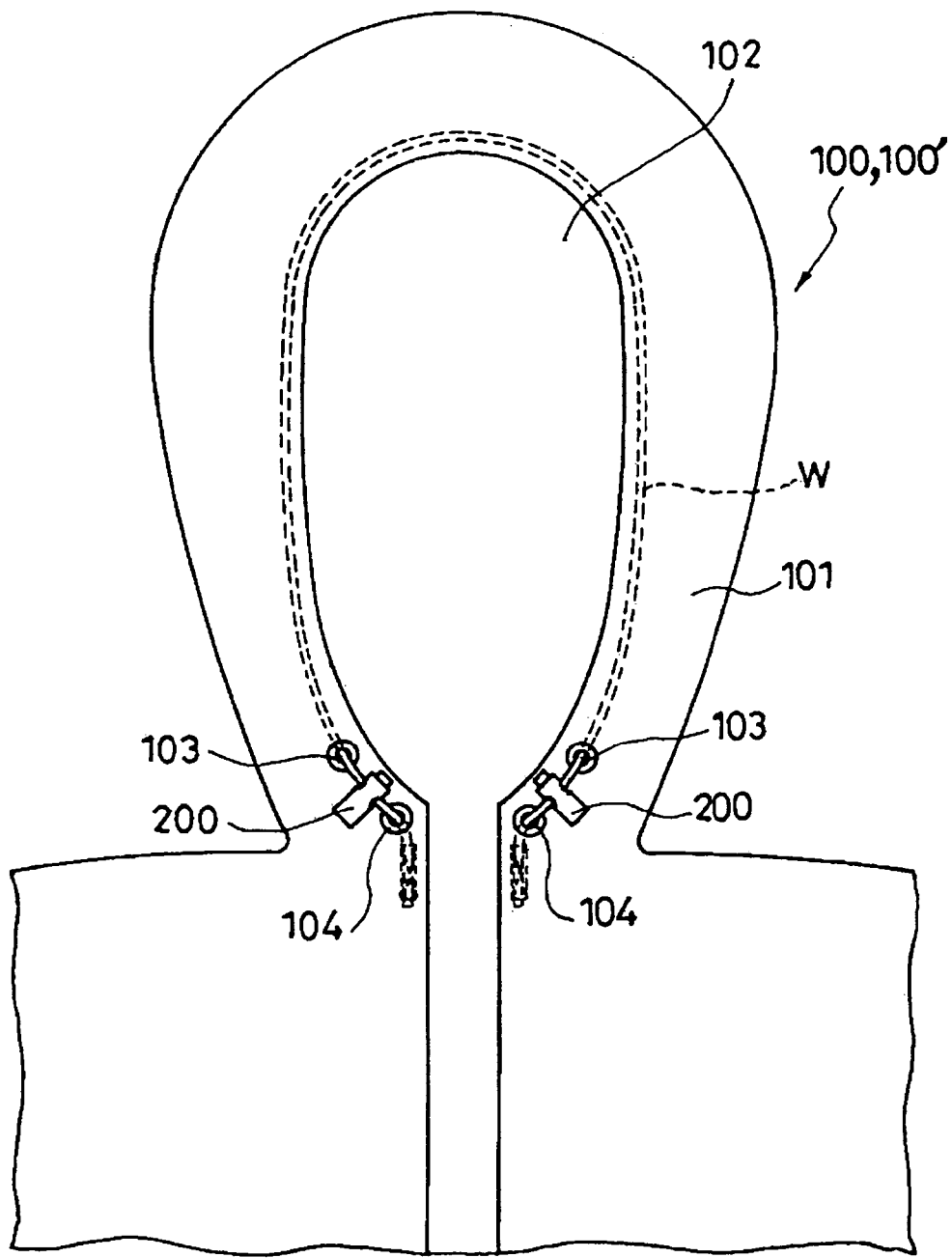
FIG. 10 is a front view showing a conventional example.

Hereunder, embodiments of the present invention will be explained with reference to the accompanying drawings. FIG. 1 is a sectional view showing a cord lock 1, in particular, a male member of the cord lock 1, according to an embodiment of the present invention. FIGS. 2 to 8 show a cord lock holder 2. In particular, FIG. 7 shows a state that a cord W is released by pushing a male member 220 of a cord lock 200 retained in the cord lock holder 2. FIG. 8 shows a state that the cord lock 200 is attached to the cord W. FIG. 9 shows an article 3 having a portion to be tightened by the cord W.

According to the embodiment of the present invention, it is easy to attach the cord lock 1 to an object. Further, with the cord lock holder 2, it is easy to attach the cord lock 200 with the cord passing therethrough to an object. Further, the article 3 has a portion to be tightened by the cord W such as a tightening cord and a pulling cord, and has a structure provided with the cord lock 1 or 200 with the cord W passing therethrough, so that the cord lock 1 or 200 works properly.

The cord lock 1 includes a female member 10 with a cylindrical shape, a male member 12 movable along an axial direction of the female member 10 and receiving a part of the female member 10, and an urging device 14 for urging the male member 12 in a direction out of the female member 10. The female member 10 and the male member 12 have holes 11 and 13 for passing the cord W therethrough, respectively. Attaching portions 15 made of an attachable material are disposed on the female member 10 of the cord lock 1.

The cord W includes a round cord and a plain cord, and may be formed of rubber or flexible plastic. The male member 12 is pushed into the female member 10, so that the holes 11 of the female member 10 are aligned with the hole 13 of the male member 12. Then, the cord W passes through the holes 11 and 13. Accordingly, the cord lock 1 is attached to the cord W with an urging force of the urging device 14. When the male member 12 is pushed into the female member 10 against the urging force of the urging device 14, the cord W is released. Accordingly, it is possible to move the cord lock 1 to a desired position relative to the cord W.

The attaching portions 15 made of an attachable material are disposed on the female member 10 of the cord lock 1. Accordingly, it is easy to attach the cord lock 1 to an attaching object 100 with the attaching portions 15. When the attaching portions 15 are made of flexible plastic, it is easy to attach the attaching portions 15 to the attaching object 100. The attaching portions 15 may be provided with thin portions 16, so that the attaching portions 15 are attached to the attaching object 100 through the thin portions 16.

The cord lock holder 2 includes a storage portion 20 for retaining a part or an entire portion of a cord lock 200, and attaching portions 22 made of an attachable material. The cord lock 200 includes a female member 210, a male member 220 movable along an axial direction of the female member 210 and receiving a part of the female member 210, and an urging device 230 for urging the male member 220 in a direction out of the female member 210. The female member 210 and the male member 220 have holes 211 and 221 for passing the cord W therethrough, respectively.

In the embodiment, it is easy to attach the cord holder 2 to the attaching object 100 with the attaching portions 22. In a state that the cord lock 200 is retained in the storage portion 20 of the cord lock holder 2, it is possible to attach the cord lock 200 at a specific position of the attaching object 100. The storage portion 20 of the cord lock holder 2 is formed in a cylindrical shape with a bottom.

The attaching portions 22 of the cord lock holder 2 are disposed at both sides of the storage portion 20 in an axial direction, and are formed in a plate shape integrated with the sides and extending in a lateral direction. One of the attaching portions 22 at one of the sides has a back surface flash with that of the other of the attaching portions 22 at the other of the sides. The back surfaces of the attaching portions 22 are flash with a back surface of the storage portion 20. The back surfaces closely contact an outer surface of the attaching object 100, and the cord lock holder 2 is attached to the attaching object 100 through the attaching portions 22.

The cord lock holder 2 is preferably made of rubber or flexible plastic, thereby making it easy to attach the attaching portion 22. A front surface of the storage portion 20 is positioned forward relative to front surfaces of the attaching portions 22. The storage portion 20 has a recess portion curved toward an opening thereof and formed in an outer surface of the bottom. A finger may be put in the recess portion to push the female member 220 of the cord lock 20 projecting from the opening of the storage portion 20.

In the embodiment, the cord lock 200 is formed of the female member 210, the male member 220, and the urging device 230. The cord lock 200 is retained in the storage portion 20 of the cord lock holder 2. The female member 210 is formed in a cylindrical shape, and the holes 211 are formed in opposing side portions of the female member 210. The male member 220 receives a part of the female member 210, and is movable along an axial direction of the female member 210. The hole 221 is formed in the male member 220 in a direction crossing a direction that the male member 220 moves. The urging device 230 urges the male member 220 in a direction out of the female member 210. The male member 220 is pushed into the female member 210 against an urging force of the urging device 230, so that the holes 211 of the female member 210 are aligned with the hole 221 of the male member 220. Accordingly, the cord W can pass through the holes 211 and 221.

In the embodiment, the female member 210 is formed in a cylindrical shape with a bottom, and the male member 220 is formed in a shaft shape. The male member 220 is provided with a flexible band 231 with a wave shape at an end portion of the shaft shape inserted into the female member 210. One end of the flexible band 231 is integrated with the end portion of the male member 220, and the other end thereof is always pressed against the bottom of the female member 210, so that the flexible band 231 deforms into a compressed shape. In other words, the flexible band 231 functions as the urging device 230. The urging device 230 may be a coil spring separate from the male member 230.

In the cord lock 200, the male member 220 is pushed into the female member 210 against an urging force of the urging device 230 until the holes 211 of the female member 210 are aligned with the hole 221 of the male member 220, so that the cord W passes through the holes 211 and 221. The storage portion 20 has holes 21 in opposing sides thereof, i.e., a front side and a rear side thereof, respectively. When the cord lock 200 is inserted into the storage portion 20 such that the bottom of the female member 210 is inserted first, the holes 21 of the storage portion 20 are aligned with the holes 211 of the female member 210. Then, the cord W passes through the holes 21, 211, and 221, so that the cord lock holder 2 is attached to the cord W.

In the embodiment, after the cord lock 200 is completely inserted into the storage portion 20 of the cord holder 2, the male member 220 is pushed into the female member 210 against an urging force of the urging device 230 until the holes 211 of the female member 210 are aligned with the hole 221 of the male member 220.

In the embodiment, the storage portion 20 of the cord holder 2 has a length from the bottom to the opening thereof substantially equal to that of the female member 210 from the bottom to the opening thereof. Accordingly, when the cord lock 200 is completely inserted into the storage portion 20 of the cord holder 2, a head portion 222 of the male member 220 protrudes from the opening of the storage portion 20. The head portion 222 is used for pushing the male member 220 against the urging force of the urging device 230.

After the cord W such as a tightening cord provided in the attaching object 100 passes through the cord lock 200 and the cord lock holder 2, the cord lock holder 2 is attached to the attaching object 100 with the attaching portions 22, thereby positioning the cord lock 200 at a desired position of the attaching object 100. The cord lock 200 retained in the cord lock holder 2 is attached to the cord W with the urging force of the urging device 230. When the male member 220 is pushed into the female member 210 against the urging force of the urging device 230, the cord lock 200 is released from the cord W. Accordingly, it is possible to freely move the cord lock 200 along the cord W.

In the embodiment, the attaching portions 22 of the cord lock holder 2 are provided with thin portions 23, so that the attaching portions 23 are attached to the attaching object 100 through the thin portions 23. Each of the attaching portions 22 has a grove 24 with open ends extending along the axial direction of the storage portion 20 between a side connected to the storage portion 20 and an opposing side. The grooves 24 form the thin portions 23 of the attaching portions 22. The cord lock holder 2 is attached to the attaching object 100 by attaching the thin portions 23 along an extending direction. Accordingly, it is easy to attach the cord lock holder to the attaching object 100.

According to the embodiment of the present invention, the article 3 has a portion to be tightened by the cord W such as a tightening cord and a pulling cord. The article 3 includes a pair of passing portions 30 penetrating through a material of the article 3. After the cord W passes to one side of the article 3 through one of the passing portions 30, the cord W is pulled out to the other side of the article 3 through the other of the passing portions 30. Then, the cord W is attached to the article 3 at the other side. The cord lock 1 or the cord lock 200 retained in the storage portion 20 of the cord lock holder 2 is attached to the cord W between the passing portions 30. Further, the cord lock 1 or the cord lock holder 2 is attached to the article 3, so that the cord lock 1 or the cord lock holder 2 covers one of the passing portions 30.

The article 3 includes various cloths, handbags, bags, briefcases, and the like. The cord W such as a tightening cord and a pulling cord passes through a loop portion formed along an opening of the article 3 while end portions of the cord W are pulled out of the loop portion. A length of the cord W along the opening, i.e., a length of the end portions, is adjusted to tighten or loose the opening.

FIG. 9 shows the embodiment in which the cord lock 200 retained in the cord lock holder 2 is attached to the cord W passing along an opening 102 of a hood 101 of a parka 100'. In the embodiment, the cord lock holder 2 covers one of the passing portions 30 at one side of the article 3. The cord W pulled out from one of the passing portions 30 passes through the cord lock 200 retained in the cord lock holder 2 situated at the front side of the article 3, i.e., the parka 100'. The cord W is drawn to the rear side of the parka 100' through the other of the passing portions 30, and the end portion of the cord W is attached to the parka 100' (attached portion 31).

When the cord lock 200 is released from the cord W, it is possible to adjust a length of the cord W only between the cord lock 200 and the other of the passing portions 30. Accordingly, it is possible to properly adjust the cord W to tighten or loose the opening 102 of the hood 101.

The disclosure of Japanese Patent Application No. 2003-294918, filed on Aug. 19, 2003, is incorporated in the application.

While the invention has been explained with reference to the specific embodiments of the invention, the explanation is illustrative and the invention is limited only by the appended claims.

What is claimed is:

1. A combination comprising a cord lock and a cord lock holder,
   wherein said cord lock comprises a female member with a cylindrical shape having first holes for passing a cord therethrough, a male member movable along an axial direction of the female member for at least entering into a part of the female member, said male member having a second hole for passing the cord therethrough, and an urging device for urging the male member in a direction to project from the female member, and
   wherein said cord lock holder comprises a storage portion for entirely receiving the cord lock therein, said storage portion having third holes, for passing the cord therethrough, located at portions corresponding to the first holes when the cord lock is situated in the storage portion, and attaching portions made of a material to be sewn to an attaching object, said attaching portions being located at two sides of the storage portion so that the storage portion is sewn to the attaching object.

2. A combination according to claim 1, wherein said cord lock holder further includes a thin portion provided in the attaching portion so that the cord lock holder is attached to the attaching object through the thin portion.

3. An article comprising a cord, a portion of the article to be tightened by the cord, a pair of passing portions for passing the cord therethrough, and the cord lock holder and the cord lock according to claim 1, said cord lock holder being fixed to said portion of the article and allowing the cord to pass through the cord lock between the passing portions so that the cord lock covers one of the passing portions.

4. A combination according to claim 1, wherein said storage portion has a recess portion formed at an outer surface of a bottom thereof to curve upwardly.

* * * * *